(12) United States Patent
Jungreis

(10) Patent No.: US 8,289,741 B2
(45) Date of Patent: Oct. 16, 2012

(54) LINE SWITCHER FOR POWER CONVERTERS

(75) Inventor: Aaron Jungreis, Richardson, TX (US)

(73) Assignee: Flextronics AP, LLC, Broomfield, CO (US)

( * ) Notice: Subject to any disclaimer, the term of this patent is extended or adjusted under 35 U.S.C. 154(b) by 401 days.

(21) Appl. No.: 12/687,761

(22) Filed: Jan. 14, 2010

(65) Prior Publication Data
US 2011/0170325 A1 Jul. 14, 2011

(51) Int. Cl.
*H02M 7/08* (2006.01)
(52) U.S. Cl. ............... 363/69; 363/65; 363/67; 363/70
(58) Field of Classification Search .......... 363/65, 363/67, 68, 69, 70, 71, 72
See application file for complete search history.

(56) References Cited

U.S. PATENT DOCUMENTS

| | | | |
|---|---|---|---|
| 4,051,425 A | 9/1977 | Smith | 363/86 |
| 4,273,406 A | 6/1981 | Okagami | |
| 4,563,731 A | 1/1986 | Sato et al. | |
| 4,645,278 A | 2/1987 | Yevak et al. | |
| 4,695,933 A | 9/1987 | Nguyen et al. | |
| 4,712,160 A | 12/1987 | Sato et al. | 361/388 |
| 4,788,626 A | 11/1988 | Neidig et al. | 361/386 |
| 4,806,110 A | 2/1989 | Lindeman | |
| 4,841,220 A | 6/1989 | Tabisz et al. | |
| 4,857,822 A | 8/1989 | Tabisz et al. | |
| 4,866,367 A | 9/1989 | Ridley et al. | |
| 4,890,217 A | 12/1989 | Conway | |
| 4,893,227 A | 1/1990 | Gallios et al. | 363/26 |
| 4,899,256 A | 2/1990 | Sway-Tin | 361/386 |
| 4,975,821 A | 12/1990 | Lethellier | 363/21 |
| 5,090,919 A | 2/1992 | Tsuji | |
| 5,101,322 A | 3/1992 | Ghaem et al. | 361/386 |

(Continued)

FOREIGN PATENT DOCUMENTS
JP 4217869 A 8/1992
(Continued)

OTHER PUBLICATIONS
International Search Report, PCT/US2011/49438, International filing Aug. 26, 2011, 10 pages.
(Continued)

*Primary Examiner* — Nguyen Tran
(74) *Attorney, Agent, or Firm* — Haverstock & Owens LLP

(57) ABSTRACT

A regulated power supply apparatus and method are provided. The apparatus includes a converter circuit for generating a regulated voltage signal. The converter circuit includes a first switching circuit and a second switching circuit both coupled with an output circuit. A first and a second transformer include a first and a second secondary, which are coupled with each other in series or alternatively, coupled with each other in parallel. An input rectifier circuit is coupled with the first and the second switching circuit. The input rectifier circuit is configured for receiving an AC input voltage and for generating a rectified voltage. The input rectifier circuit includes controlled switches and a first and second configuration of a bridge rectifier that couples the first and second switching circuits in series or parallel depending if the AC input power signal is "high-line" or "low-line." A controller circuit is provided for enabling either the first configuration or the second configuration. A configuration switch is controlled by the controller circuit for coupling the first and second switching circuits together.

30 Claims, 11 Drawing Sheets

U.S. PATENT DOCUMENTS

| | | | | |
|---|---|---|---|---|
| 5,132,890 | A | 7/1992 | Blandino | |
| 5,164,657 | A | 11/1992 | Gulczynski | 323/275 |
| 5,235,491 | A | 8/1993 | Weiss | 361/694 |
| 5,262,932 | A | 11/1993 | Stanley et al. | 363/26 |
| 5,295,044 | A | 3/1994 | Araki et al. | 361/709 |
| 5,365,403 | A | 11/1994 | Vinciarelli et al. | |
| 5,438,294 | A | 8/1995 | Smith | |
| 5,490,052 | A | 2/1996 | Yoshida et al. | 363/15 |
| 5,565,761 | A | 10/1996 | Hwang | 323/222 |
| 5,565,781 | A | 10/1996 | Dauge | 324/403 |
| 5,592,128 | A | 1/1997 | Hwang | 331/61 |
| 5,673,185 | A | 9/1997 | Albach et al. | 363/45 |
| 5,712,772 | A | 1/1998 | Telefus et al. | 363/21 |
| 5,742,151 | A | 4/1998 | Hwang | 323/222 |
| 5,747,977 | A | 5/1998 | Hwang | 323/284 |
| 5,786,687 | A | 7/1998 | Faulk | |
| 5,786,992 | A * | 7/1998 | Vinciarelli et al. | 363/89 |
| 5,790,395 | A | 8/1998 | Hagen | |
| 5,798,635 | A | 8/1998 | Hwang et al. | 323/222 |
| 5,804,950 | A | 9/1998 | Hwang et al. | 323/222 |
| 5,811,895 | A | 9/1998 | Suzuki et al. | 307/125 |
| 5,818,207 | A | 10/1998 | Hwang | 323/288 |
| 5,838,554 | A | 11/1998 | Lanni | |
| 5,859,771 | A | 1/1999 | Kniegl | |
| 5,870,294 | A | 2/1999 | Cyr | 363/41 |
| 5,894,243 | A | 4/1999 | Hwang | 327/540 |
| 5,903,138 | A | 5/1999 | Hwang et al. | 323/266 |
| 5,905,369 | A | 5/1999 | Ishii et al. | 323/272 |
| 5,923,543 | A | 7/1999 | Choi | 363/21 |
| 6,009,008 | A * | 12/1999 | Pelly | 363/125 |
| 6,058,026 | A | 5/2000 | Rozman | 363/16 |
| 6,069,803 | A | 5/2000 | Cross | 363/21 |
| 6,091,233 | A | 7/2000 | Hwang et al. | 232/222 |
| 6,091,611 | A | 7/2000 | Lanni | |
| 6,160,725 | A | 12/2000 | Jansen | 363/65 |
| 6,183,302 | B1 | 2/2001 | Daikuhara et al. | |
| 6,272,015 | B1 | 8/2001 | Mangtani | 361/707 |
| 6,275,397 | B1 | 8/2001 | McClain | |
| 6,282,092 | B1 | 8/2001 | Okamoto et al. | 361/704 |
| 6,307,761 | B1 * | 10/2001 | Nakagawa | 363/65 |
| 6,323,627 | B1 | 11/2001 | Schmiederer et al. | |
| 6,326,740 | B1 | 12/2001 | Chang et al. | |
| 6,344,980 | B1 | 2/2002 | Hwang et al. | |
| 6,366,483 | B1 | 4/2002 | Ma et al. | 363/87 |
| 6,385,059 | B1 | 5/2002 | Telefus et al. | |
| 6,388,897 | B1 | 5/2002 | Ying et al. | |
| 6,390,854 | B2 | 5/2002 | Yamamoto et al. | |
| 6,396,277 | B1 | 5/2002 | Fong et al. | 324/402 |
| 6,407,514 | B1 | 6/2002 | Glaser et al. | 315/247 |
| 6,459,175 | B1 | 10/2002 | Potega | |
| 6,469,914 | B1 | 10/2002 | Hwang et al. | 363/210.1 |
| 6,469,980 | B1 | 10/2002 | Takemura et al. | 369/275.3 |
| 6,483,281 | B2 | 11/2002 | Hwang | 323/299 |
| 6,487,095 | B1 | 11/2002 | Malik et al. | |
| 6,487,098 | B2 | 11/2002 | Malik et al. | |
| 6,531,854 | B2 | 3/2003 | Hwang | 323/285 |
| 6,541,944 | B2 | 4/2003 | Hwang | 323/225 |
| 6,549,409 | B1 | 4/2003 | Saxelby et al. | |
| 6,583,999 | B1 | 6/2003 | Spindler et al. | |
| 6,605,930 | B2 | 8/2003 | Hwang | 323/225 |
| 6,657,417 | B1 | 12/2003 | Hwang | 323/222 |
| 6,671,189 | B2 | 12/2003 | Jansen et al. | 363/21.14 |
| 6,674,272 | B2 | 1/2004 | Hwang | 323/284 |
| 6,775,162 | B2 | 8/2004 | Mihai et al. | |
| 6,894,461 | B1 | 5/2005 | Hack et al. | |
| 6,919,715 | B2 | 7/2005 | Muratov et al. | |
| 6,958,920 | B2 | 10/2005 | Mednik et al. | 363/19 |
| 6,970,366 | B2 | 11/2005 | Apeland et al. | |
| 7,035,126 | B1 | 4/2006 | Lanni | |
| 7,038,406 | B2 | 5/2006 | Wilson | |
| 7,047,059 | B2 | 5/2006 | Avrin et al. | 600/409 |
| 7,064,497 | B1 | 6/2006 | Hsieh | |
| 7,102,251 | B2 | 9/2006 | West | |
| 7,139,180 | B1 | 11/2006 | Herbert | |
| 7,202,640 | B2 | 4/2007 | Morita et al. | |
| 7,208,833 | B2 | 4/2007 | Nobori et al. | |
| 7,212,420 | B2 | 5/2007 | Liao | |
| 7,274,175 | B2 | 9/2007 | Manolescu | |
| 7,286,376 | B2 | 10/2007 | Yang | 363/97 |
| 7,324,354 | B2 | 1/2008 | Joshi et al. | |
| 7,386,286 | B2 | 6/2008 | Petrovic et al. | |
| 7,450,388 | B2 | 11/2008 | Beihoff et al. | |
| 7,499,301 | B2 | 3/2009 | Beihoff et al. | |
| 7,545,256 | B2 | 6/2009 | O'Toole et al. | |
| 7,564,706 | B1 | 7/2009 | Herbert | |
| 7,570,497 | B2 | 8/2009 | Jacques et al. | |
| 7,639,520 | B1 | 12/2009 | Zansky et al. | |
| 7,701,305 | B2 | 4/2010 | Lin et al. | |
| 7,764,515 | B2 | 7/2010 | Jansen et al. | |
| 2002/0008963 | A1 | 1/2002 | Dibene, II et al. | |
| 2002/0011823 | A1 | 1/2002 | Lee | 320/137 |
| 2002/0036200 | A1 | 3/2002 | Ulrich | |
| 2003/0035303 | A1 | 2/2003 | Balakrishnan et al. | 363/16 |
| 2004/0183510 | A1 | 9/2004 | Sutardja et al. | |
| 2004/0228153 | A1 | 11/2004 | Cao et al. | 363/71 |
| 2004/0252529 | A1 | 12/2004 | Huber et al. | |
| 2005/0024016 | A1 | 2/2005 | Breen et al. | |
| 2005/0036338 | A1 | 2/2005 | Porter et al. | |
| 2005/0105224 | A1 | 5/2005 | Nishi | 361/18 |
| 2005/0117376 | A1 | 6/2005 | Wilson | |
| 2005/0138437 | A1 | 6/2005 | Allen et al. | |
| 2005/0194942 | A1 | 9/2005 | Hack et al. | |
| 2005/0225257 | A1 | 10/2005 | Green | |
| 2005/0281425 | A1 | 12/2005 | Greuet et al. | 381/331 |
| 2006/0002155 | A1 | 1/2006 | Shteynberg et al. | |
| 2006/0022637 | A1 | 2/2006 | Wang et al. | |
| 2006/0152947 | A1 | 7/2006 | Baker et al. | |
| 2007/0040516 | A1 | 2/2007 | Chen | |
| 2007/0138971 | A1 | 6/2007 | Chen | |
| 2007/0247091 | A1 | 10/2007 | Maiocchi | |
| 2007/0263415 | A1 | 11/2007 | Jansen et al. | |
| 2008/0191667 | A1 | 8/2008 | Kernahan et al. | |
| 2009/0290384 | A1 | 11/2009 | Jungreis | |
| 2009/0290385 | A1 | 11/2009 | Jungreis et al. | |
| 2010/0289466 | A1 | 11/2010 | Telefus et al. | |
| 2010/0322441 | A1 | 12/2010 | Weiss et al. | |
| 2011/0261590 | A1 | 10/2011 | Liu | |

FOREIGN PATENT DOCUMENTS

| | | |
|---|---|---|
| JP | 10243640 A | 9/1998 |
| JP | 2000083374 A | 3/2000 |
| JP | 2000253648 A | 9/2000 |
| JP | 2004208357 A | 7/2004 |

OTHER PUBLICATIONS

EE Times.com—"Team Claims Midrange Wireless Energy Transfer", by R. Colin Johnson, 4 pages, Nov. 20, 2006.

EE Times.com—"Wireless Beacon Could Recharge Consumer Devices", by R. Colin Johnson, 3 pages, Jan. 11, 2007.

"Novel Zero-Voltage and Zero-Current-Switching (ZVZCS) Full-Bridge PWM Converter Using Coupled Output Inductor", Hang-Seok Choi et al.,Sep. 2002, IEEE, pp. 641-648.

"New Architectures for Radio Frequency dc/dc Power Conversion", Juan Rivas et al., Laboratory for Electromagnetic and Electronic Systems, Massachusetts Insutitute of Technology, Room 10-171 Cambridge, MA 02139, pp. 4074-4084, Jan. 2004.

"Electronic Transformer for a 12V Halogen Lamp", by Scollo, P. Fichera, Jan. 1999, ST Microelectronics pp. 1-4.

"An Automatic Line Voltage Switching Circuit" SGS-Thomson Microelectronics, by Vajapeyam Sukumar and Thierry Castagnet, Application Note, 6 pages, copyright 1995 SGS-Thomson Microelectronics-printed in Italy.

Bead Probe Handbook Successfully Implementing Agilent Medalist Bead Probes in Practice, "6 Test Fixturing", copyright Agilent Technologies, Inc., 2007, pp. 81-96.

SGS-Thomson Microelectronics Application Note, "An Automatic Line Voltage Switching Circuit", Vajapeyam Sukumar and Thierry Castagnet, copyright 1995 SGS-Thomson Microelectronics, Printed in Italy, 6 pages.

Notice of Allowance, date mailed Sep. 17, 2010, U.S. Appl. No. 12/079,662, filed Mar. 27, 2008, 27 pages.

* cited by examiner

LINE SWITCHER FOR POWER CONVERTERS

FIELD OF THE INVENTION

The present invention relates to the field of power supplies. More particularly, the present invention relates to a line switcher circuit for a power supply apparatus.

BACKGROUND

In many applications a voltage regulator is required to provide a voltage within a predetermined range. Some circuits are subject to uncertain and undesirable functioning and even irreparable damage if an input power supply falls outside a certain range.

AC to DC converters are typically designed to operate over a wide voltage range such as 90 VAC to 264 VAC so that the converters can operate with AC line voltages from anywhere in the world. In practice, the AC line voltages encountered throughout the world lie within the ranges 90 VAC-132 VAC for "low-line" operation and 180 VAC to 264 VAC for "high-line" operation. The cost of the main switching semiconductors of conventional AC to DC converters and the losses in the converters increase dramatically with the range of input voltages supported by the converter. This is especially true when the converters use MOSFETs for the main switching semiconductors. A converter designed to operate over only one of the "low-line" or the "high-line" range, a ratio of 1.46:1, would be less costly and more efficient than a converter designed to operate over the entire range of "low-line" and "high-line", 90 VAC to 264 VAC, a ratio of 2.93:1.

Conventional low-power converters, typically less than 65 watts, usually do not have government requirements for a high power factor and typically operate with a low power factor. These low-power converters usually employ voltage doublers that are enabled at "low-line" and disable at "high-line." The converter circuit following the voltage doubler is designed with circuits rated for "high-line" operation, even if the AC line is at "low-line". This is inefficient and costly.

FIG. 5 illustrates the conventional line switcher 500. In the conventional line switcher 500, at approximately 230 VAC of an AC line 502, the switch S1 is open so that a standard diode bridge 505 charges a first and second large electrolytic capacitors C1, C2 that are in series to the peak of the 230 VAC of the AC line 502. The switch S1 can be a triac, a mechanical switch, or can be a configuration of contacts that occurs when a user inserts a line plug connector block into a device. At 115 VAC of the AC line 502, the switch S1 is closed causing each of the first and second large electrolytic capacitors C1, C2 to charge to the peak of the 115 VAC of the AC line 502. Since the capacitors C1 and C2 are in series, the total voltage Vin is a value that is twice the peak voltage of the AC line 502. Effectively, the switch S1 causes an input section of the line switcher 500 to operate as a voltage doubler at low-line.

The switch S1 is controlled to couple a terminal of the AC line 502 to a tie point 514 of the first and second large electrolytic capacitors C1, C2. At high-line, both the first and second large electrolytic capacitors C1, C2 are connected across the diode bridge 505 during both positive and negative half cycles. At low-line, only one of the first and second large electrolytic capacitors C1, C2 is connected across the diode bridge 505 at a time. Specifically, the capacitor C1 is connected during the positive half-cycle and the capacitor C2 is connected during the negative half cycle. The first and second large electrolytic capacitors C1, C2 have a capacitance so large that the first and second large electrolytic capacitors C1, C2 are able to maintain their charge from one 50/60 Hz cycle to the next cycle.

In the conventional line switcher 500, a single converter (not shown) can be connected across the series combination of the first and second large electrolytic capacitors C1, C2 (Cin). An advantage is that the single converter (not shown) is always driven at a voltage equal to the peak of the voltage at high-line, regardless of whether the input AC voltage of the AC line 502 is at high-line or low-line. The converter cost is therefore decreased. A disadvantage of the conventional line switcher 500 is that it draws a power with a poor power factor and is therefore only useful, in practice, for small converters such as those below 75 W. Another disadvantage of the conventional line switcher 500 is a reduced efficiency caused by the high pulsed currents used to charge the first and second large electrolytic capacitors C1, C2.

Accordingly, it is desirable to create a regulated power supply operable over both "low-line" and "high-line" ranges with a reduced cost and a greatly increased power factor and efficiency.

SUMMARY OF THE INVENTION

The present invention uses thyristors and intelligent sensing and switching schemes to provide fast switching from low-line (85 VAC-132 VAC) to high-line (180 VAC-264 VAC). Rather than turning a single semiconductor switch on or off to enable a voltage doubler, the present invention turns several semiconductor switches on or off to place two half-sized converter input stages in series or parallel, depending on whether the line is low or high. The transformer isolation stage allows the converters to be placed in series or parallel on the primary-side of the transformer while the secondary-sides of the two converters can be appropriately connected, without regard for whether the primary-sides are in parallel or series. Converters with multiple outputs can be combined in much the same way as converters with a single output. The exact method of combining the secondary sides of the converters will depend on the type of converter and the design constraints.

In accordance with a first aspect of the present invention, a power supply apparatus is provided. The apparatus includes a converter circuit including a first switching circuit and a second switching circuit both coupled with an output circuit. An input rectifier circuit is configured for receiving an AC input voltage and for generating a rectified voltage. The input rectifier circuit is coupled with a first and a second input of the first and the second switching circuit, respectively. The input rectifier circuit includes one or more controlled switches. The input rectifier circuit includes a first configuration of a bridge rectifier and a second configuration of the bridge rectifier. A controller circuit is coupled with a configuration switch and coupled with the input rectifier circuit for providing a control signal for enabling either the first configuration or the second configuration according to a parameter of the AC input voltage. The control signal enables the configuration switch. The first configuration couples the first and second input of the first and the second switching circuit, respectively, in series. The second configuration couples the first and second input of the first and the second switching circuit, respectively, in parallel. The configuration switch is controlled by the controller circuit for coupling the first and second switching circuit together.

The first switching circuit includes a first switching device coupled with a first primary. The second switching circuit includes a second switching device coupled with a second primary. The first and second primary are included in a first and second transformer of the first and the second switching circuit, respectively. The first configuration includes a first set of switches that includes a first pair and a second pair of semiconductor switches and the second configuration includes a second set of switches that includes the first set of switches and the one or more controlled switches. The one or more controlled switches include a first pair of gate-driven semiconductor switches and a second pair of gate-driven semiconductor switches. The first configuration includes the bridge rectifier coupled through an enabled configuration switch. The second configuration includes the configuration switch being disabled and the first and second pair of gate-driven semiconductor switches being enabled. The second configuration couples the first and second input of the first and the second switching circuit in parallel by coupling each of the first and the second input across the same rectified voltage generated by the input rectifier circuit.

A gate drive circuit is coupled with the first and the second pair of gate-driven semiconductor switches. The gate drive circuit is enabled by the control signal generated by the controller circuit. The enabled gate drive circuit provides a gate current to the first and the second pair of gate-driven semiconductor switches. The parameter of the AC input voltage is a voltage in either a high-line range (180 VAC-264 VAC) or a voltage in a low-line range (85 VAC-132 VAC). The configuration switch includes a semiconductor switch. Alternatively, the configuration switch includes a gate-driven semiconductor switch. In yet another embodiment, the configuration switch includes a mechanical switch including mechanical contacts. A reset switch includes a gate-driven semiconductor switch. The reset switch is enabled by the controller circuit when the controller circuit determines a change in the AC input voltage from a low-line level to a high-line level.

The first and the second transformer include a first and a second secondary, which are coupled with each other in series. Alternatively, the first and second secondary, are coupled with each other in parallel. In yet another embodiment, the first and second secondary, are coupled via an ORed diode.

In accordance with a second aspect of the present invention, a method of regulating a power supply apparatus is provided. The method includes receiving an AC input voltage at an input rectifier circuit. The input rectifier circuit includes one or more controlled switches. The input rectifier circuit includes a first configuration of a bridge rectifier and a second configuration of the bridge rectifier. A parameter of the AC input voltage is sensed with a controller circuit. The controller circuit is coupled with a configuration switch and coupled with the input rectifier circuit for providing a control signal for enabling either the first configuration or the second configuration according to the parameter of the AC input voltage. The first configuration couples a first and second input of a first and a second switching circuit, respectively, in series. The second configuration couples the first and second input of the first and the second switching circuit, respectively, in parallel. The configuration switch is controlled by the controller circuit for coupling the first and second switching circuit together. A rectified voltage is generated according to the parameter of the AC input voltage either with the first configuration or the second configuration. An output voltage signal is generated with a converter circuit that is couples with the input rectifier circuit. The converter circuit includes the first switching circuit and the second switching circuit both coupled with an output circuit.

The first switching circuit includes a first switching device coupled with a first primary. The second switching circuit includes a second switching device coupled with a second primary. The first and second primary are included in a first and second transformer of the first and the second switching circuit, respectively. The first configuration includes a first set of switches that includes a first pair and a second pair of semiconductor switches and the second configuration includes a second set of switches that includes the first set of switches and the one or more controlled switches. The one or more controlled switches includes a first pair of gate-driven semiconductor switches and a second pair of gate-driven semiconductor switches. The first configuration includes the bridge rectifier coupled through an enabled configuration switch. The second configuration includes the configuration switch being disabled and the first and second pair of gate-driven semiconductor switches being enabled. The second configuration couples the first and second input of the first and the second switching circuit in parallel such that each of the first and the second input is coupled across the same rectified voltage generated by the input rectifier circuit.

The method includes enabling a gate drive circuit by generating the control signal. The gate drive circuit is coupled with the first and the second pair of gate-driven semiconductor switches. The enabled gate drive circuit provides a gate current to the first and the second pair of gate-driven semiconductor switches. The parameter of the AC input voltage includes a voltage in either a high-line range (180 VAC-264 VAC) or a voltage in a low-line range (85 VAC-132 VAC). The configuration switch is enabled with the control signal. The configuration switch includes a semiconductor switch. Alternatively, the configuration switch includes a gate-driven semiconductor switch.

A reset switch is enabled with the controller circuit when the controller circuit determines a change in the AC input voltage from a low-line level to a high-line level. The reset switch includes a gate-driven semiconductor switch. The first and the second transformer are provided so that a first and a second secondary are coupled with each other in series. Alternatively, the first and second secondary are coupled with each other in parallel. In yet another embodiment, the first and second secondary are coupled with each via an ORed diode.

Other features of the present invention will become apparent from consideration of the following description taken in conjunction with the accompanying drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description numerous details and alternatives are set forth for the purpose of explanation. However, one of ordinary skill in the art will realize that the invention can be practiced without the use of these specific details. In other instances, well-known structures and devices are shown in block diagram form in order not to obscure the description of the invention with unnecessary detail.

The present invention uses thyristors and intelligent sensing and switching schemes to provide fast switching from low-line (85 VAC-132 VAC) to high-line (180 VAC-264 VAC). The present invention takes advantage of the similar voltage drop between a diode and an SCR to provide a low-cost switcher which has an efficiency close to that of a traditional input rectifier. Although the cost of the thyristors is higher than that of a diode, the additional costs are offset by the costs of designing a wide-input-voltage-range converter above a nominal power level. For example, a MOSFET die size and ultimately cost, tends to increase a factor of five each time the voltage rating is doubled for a given operating resistance. Also, the cost of copper loss on magnetic structures such as inductors and transformers, increases by a factor of four when operating over a wide input voltage range instead of a narrow range.

The present invention includes a controlled bridge rectifier arrangement that allows switching between low-line and high-line operation in a way that feeds a rectified low-line line-voltage to each of two converters (or loads, if there are two separate loads) all of the time, regardless of whether the line voltage is operating at high-line or low-line.

Figure 1:
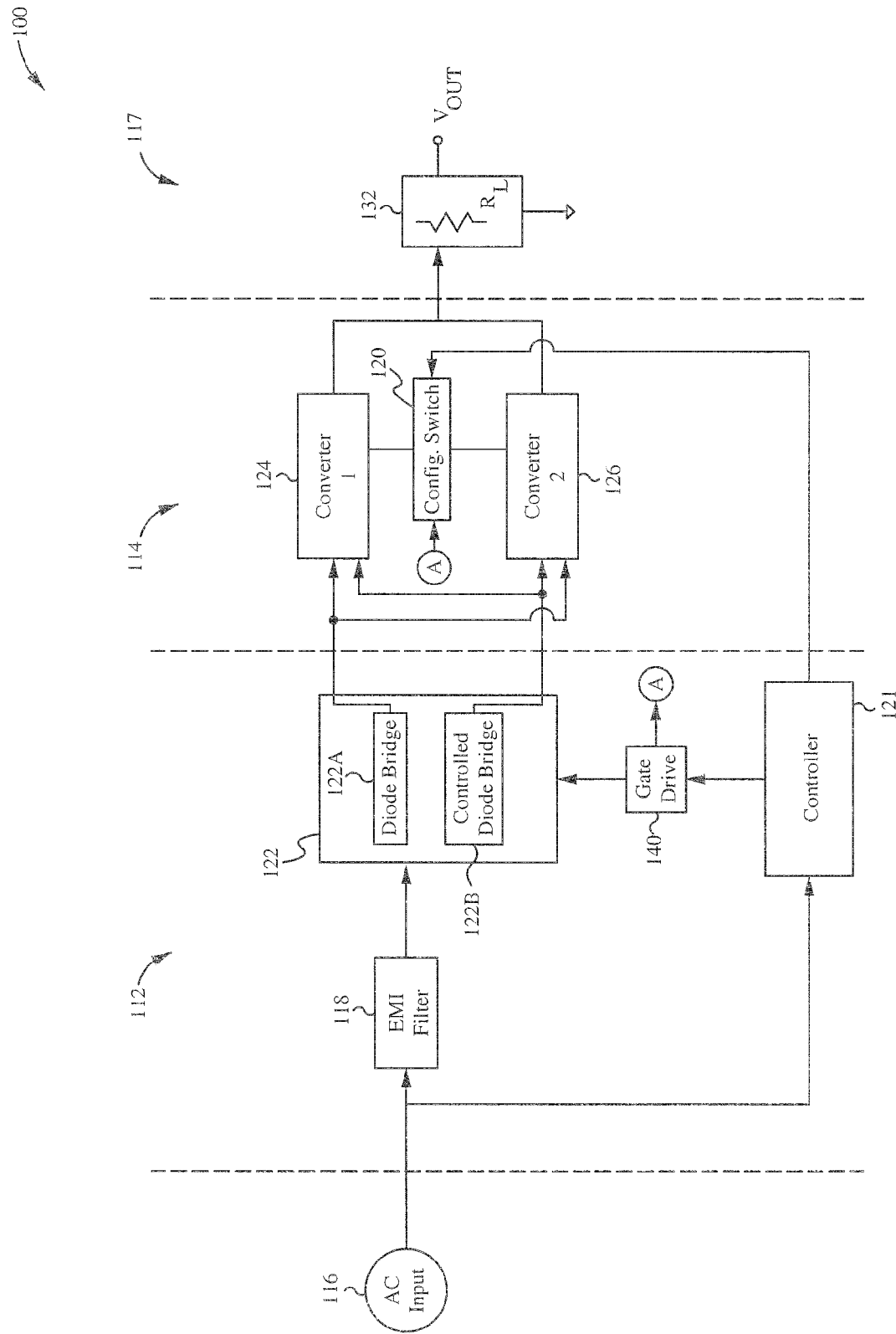
FIG. 1 illustrates a functional block diagram of a power supply apparatus in accordance with an embodiment of the invention.

Turning to FIG. 1, a functional block diagram is shown for a regulated power supply apparatus 100 according to an embodiment of the invention. The apparatus 100 is configured as a dual isolated power supply, which includes a novel line switching circuit. The apparatus 100 includes an input rectifier or controlled rectifier circuit 112 coupled with a converter circuit 114 that is coupled with an output circuit 117. A controller 121 is also coupled with the controlled rectifier circuit 112.

The controlled rectifier circuit 112 generally includes a filter circuit 118 that is coupled with a controlled input rectifier circuit 122. An AC input 116 is coupled with the filter circuit 118. The input rectifier circuit 122 includes a first configuration of a bridge rectifier 122A and a second configuration of a bridge rectifier 122A 122B. The first configuration a diode bridge 122A to the converter circuit 114. The second configuration includes coupling a controlled bridge 122B and the diode bridge 122A with the converter circuit 114. The AC input 116 is configured to receive an AC input signal from an AC line or AC source. The AC input signal can have a voltage potential at a "low-line" range (85 VAC-132 VAC) as well as at a "high-line" (180 VAC-264 VAC) range. The AC input signal is coupled with the filter circuit 118 which includes an EMI filter 118 which is used to remove undesirable harmonic noise contained in the AC input signal. The filter circuit 118 can also prevent any harmonic noise generated by the power supply apparatus 100 from entering the AC source that provides the AC input signal. While the filter circuit 118 is used in most practical applications, it is not required for the present invention to function.

The controller 121 senses whether the AC input signal is in the range of 85 VAC-132 VAC ("low-line") or the range of 180 VAC-264 VAC ("high-line"). If the AC input signal is in the "high-line" range, the configuration switch 120 is enabled by a control signal of the controller 121 and the controlled bridge 122B is disabled from coupling the AC input signal to the converter circuit 114. If the AC input signal is in the "low-line" range, the configuration switch 120 is disabled by the control signal of the controller 121 and the controlled bridge 122B is enabled to couple the AC input signal to the converter circuit 114. In any event, the first or the second configuration of the bridge rectifier 122 generates an unregulated rectified voltage signal that is coupled with the converter circuit 114. The gate drive circuit 140 is enabled by the controller 121 for generating a gate current for operating the configuration switch 120 and operating the controlled diode bridge 122B.

The converter circuit 114 comprises two isolated converters. The converter circuit 114 generally includes a first switching circuit 124 coupled with a second switching circuit 126. In either the first configuration or the second configuration of 122, the converter circuit 114 is coupled with the output circuit 117. In the first configuration of 122, the first and the second switching circuits 124, 126 are coupled such that an input of the first and the second switching circuits 124, 126 are coupled in series with the first configuration of the bridge rectifier 122. In the second configuration of 122, the first and the second switching circuits 124, 126 are coupled such that the input of the first and the second switching circuits 124, 126 are each coupled in parallel through the bridge rectifier 122 to the AC input 116.

Figure 2A:
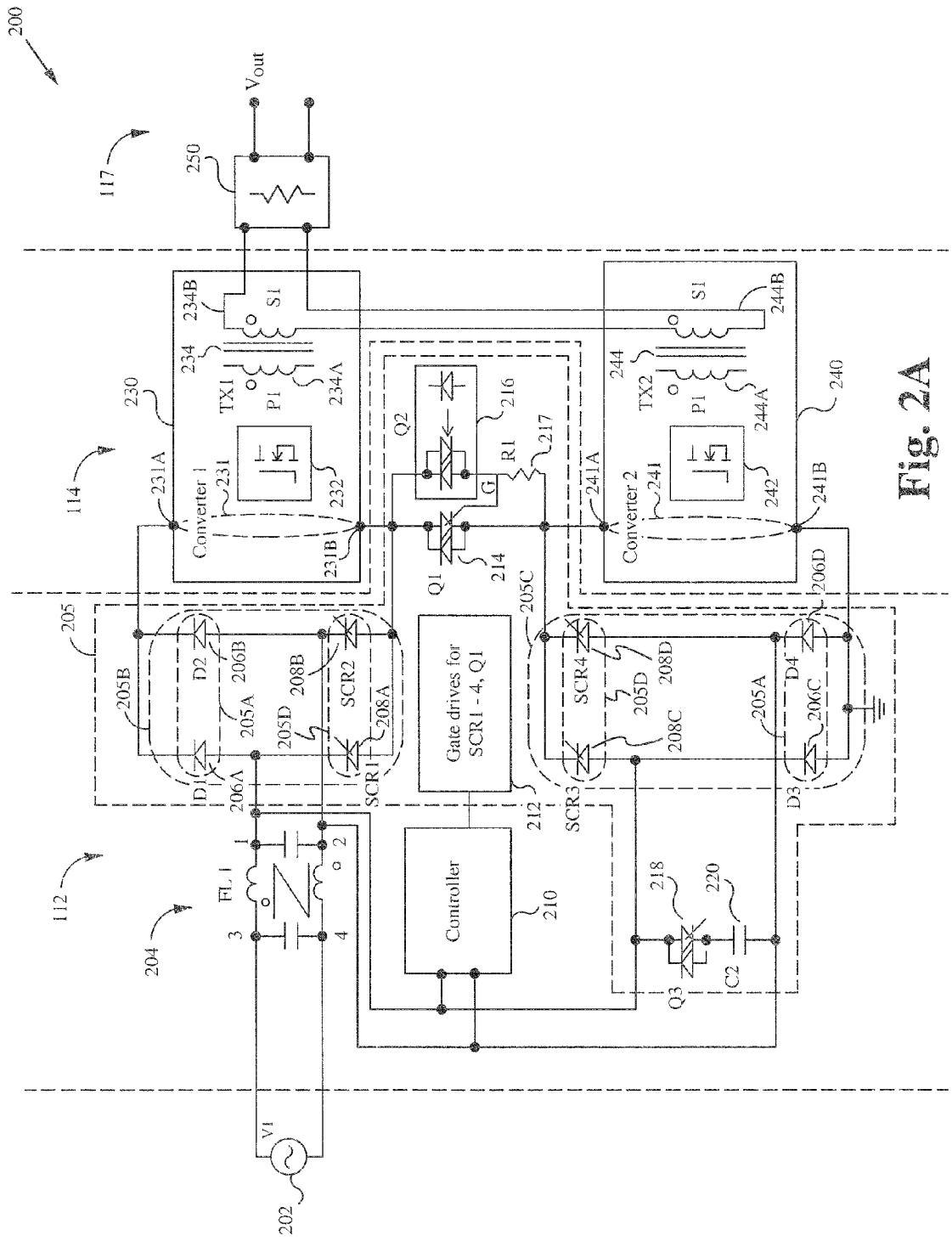
FIG. 2A illustrates a schematic diagram of a power supply apparatus in accordance with an embodiment of the invention.

FIG. 2A illustrates an exemplary schematic diagram of the regulated power apparatus 100 of FIG. 1. A regulated power apparatus 200 is provided according to an embodiment of the present invention. The apparatus 200 is configured as a dual isolated buck-type power supply, which includes a novel line switching circuit. The apparatus 200 includes an input rectifier or controlled rectifier circuit 112, also known as an AC to DC converter, coupled with a converter circuit 114 that is coupled with an output circuit 117. A controller 210 is also coupled with the controlled rectifier circuit 112. A person of skill in the art will appreciate alternative schematic variations of the controlled rectifier circuit 112, the converter circuit 114 and the output circuit 117 described below.

The controlled rectifier circuit 112 generally includes a filter circuit 204 that is coupled with an input rectifier circuit 205. An AC input 202 is coupled with the filter circuit. The AC input 202 is configured to receive an AC input signal from an AC line or AC source. The AC input signal can have a voltage potential at a "low-line" range (85 VAC-132 VAC) as well as at a "high-line" range (180 VAC-264 VAC). The AC input signal is coupled with the filter circuit 204 which includes an EMI filter 204 which is used to remove undesirable harmonic noise contained in the AC input signal. The filter circuit 204 can also prevent any harmonic noise generated by the power supply apparatus 200 from entering the AC source that provides the AC input signal.

The input rectifier circuit 205 generally includes a first and a second pair of semiconductor switches 206A, 206B and 206C, 206D respectfully coupled with the filter circuit 204, a first and a second pair of gate-driven semiconductor switches 208A, 208B and 208C, 208D respectfully also coupled with the filter circuit 204, a gate drive circuit 212 coupled with the gate-driven switches 208A-208D, a configuration switch 214 coupled with the gate-driven switches 208A-208D and a reset switch 218 coupled across the ac input 202. A terminal '1' and terminal '2' of the filter circuit 204 are coupled with an anode of the first pair of semiconductor switches 206A, 206B respectively. The terminal '1' and terminal '2' of the filter circuit 204 are also coupled with a cathode of the first pair of gate-driven semiconductor switches 208A, 208B respectively. A cathode of each of the first pair of semiconductor switches 206A, 206B is coupled to an upper node 231A of an input 231 of a first switching circuit 230. An anode of each of the first pair of gate-driven semiconductor switches 208A, 208B is coupled to a lower node 231B of the input 231. A terminal '3' and terminal '3' of the filter circuit 204 are coupled with an anode of the second pair of semiconductor switches 206C, 206D respectively. The terminal '3' and terminal '4' of the filter circuit 204 are also coupled with a cathode of the second pair of gate-driven semiconductor switches 208C, 208D respectively. A cathode of each of the second pair of semiconductor switches 206C, 206D is coupled to an upper node 241A of an input 241 of a second switching circuit 240. An anode of each of the second pair of gate-driven semiconductor switches 208C, 208D is coupled to a lower node 241B of the input 241.

The input rectifier circuit 205 includes a first set of switches of a bridge rectifier or a first configuration of a bridge rectifier 205A comprising the first and the second pair of semiconductor switches 206A, 206B and 206C, 206D. The first configuration of the bridge rectifier 205A is enabled by the controller circuit 210, and the controller circuit 210 configures the first and second inputs 231, 241 of the first and the second switching circuits 230, 240 in a series coupling through the configuration switch 214 when the first configuration 205A is enabled. When enabled, the first configuration 205A provides a full-wave rectification to the AC input signal that is felt across the series coupling of the first and second switching circuits 230, 240.

The input rectifier circuit 205 also includes a second set of switches of a bridge rectifier or a second configuration of a bridge rectifier 205B, 205C. The second set of switches 205B, 205C includes the first set of switches 205A and a set of controlled switches 205D. The first set of switches 205A comprises the first and the second pair of semiconductor switches 206A, 206B and 206C, 206D. The set of controlled switches 205D comprises the first pair and the second pair of gate-driven semiconductor switches 208A, 208B and 208C, 208D, respectively. The second configuration of the bridge rectifier 205B, 205C is enabled by the controller circuit 210, and the controller circuit 210 configures the first and second inputs 231, 241 of the first and the second switching circuits 230, 240 in a parallel coupling through the set of controlled switches 205D when the second configuration 205B, 205C is enabled. When enabled, the second configuration 205B, 205C provides full-wave rectification to the AC input signal that is felt across the parallel coupling of the first and second switching circuits 230, 240. The first and second pair of gate-driven semiconductor switches 208A-208D can comprise any suitable type of switches. In an exemplary embodiment, the first and second pair of gate-driven semiconductor switches 208A-208D comprise gate-driven semiconductor switches such as thyristors or SCRs (silicon-controlled rectifier). In one embodiment, the first and second pair of gate-driven semiconductor switches 208A-208D comprise sensitive-gate SCRs.

The gate drive 212 is coupled with a gate of the first and second pair of gate-driven semiconductor switches 208A, 208B and 208A, 208B, and coupled with a gate of the configuration switch 214 as well as coupled with a gate of the reset switch 218. The gate drive circuit is enabled and disabled by the controller circuit 210. The gate drive 212 provides a gate current for turning on the first and second pair of gate-driven semiconductor switches 208A, 208B and 208A, 208B, the configuration switch 214 and the reset switch 218. A 'G' terminal of an optically-coupled TRIAC (TRIode for Alternating Current) 216 is coupled with the gate of the configuration switch 214. The G terminal is also coupled with the upper node 241A of the second switching circuit 240 through resistor 217. A first terminal of the TRIAC 216 is coupled to the lower node 231B of the first switching circuit 230. The optically-coupled TRIAC 216 is utilized to provide the gate current to the configuration switch 214. Other means known to a person of skill in the art can also be used in providing the gate current to the configuration switch 214. The optically-coupled TRIAC 216 can comprise any suitable type of switch. In an exemplary embodiment, the optically-coupled TRIAC 216 comprises a gate-driven semiconductor switch such as a TRIAC or an SCR. In one embodiment, the optically-coupled TRIAC 216 comprises a sensitive-gate SCR.

A first terminal of the configuration switch 214 is coupled to the anodes of the first pair of gate-driven semiconductor switches 208A, 208B and coupled to the lower node 231B. A second terminal of the configuration switch 214 is coupled to the cathodes of the second pair of gate-driven semiconductor switches 208C, 208D and coupled to the upper node 241A. The configuration switch 214 is enabled by the control signal that is generated by the controller circuit 210. When the configuration switch 214 is enabled, a short circuit results and couples the first and second input 231, 241 of the first and second switching circuit 230, 240 in a series coupling. The configuration switch 214 is disabled by the control signal that is generated by the controller circuit 210. When the configuration switch 214 is disabled, an open circuit results and provides the first and second input 231, 241 of the first and second switching circuit 230, 240 in a parallel coupling. The configuration switch 214 is enabled when the input rectifier circuit 205 is in the first configuration 205A, and disabled when the input rectifier circuit 205 is in the second configuration 205B, 205C. The configuration switch 214 can comprise any suitable type of switch. In an exemplary embodiment, the configuration switch 214 comprises a semiconductor switch, preferably a gate-driven semiconductor switch such as a TRIAC or an SCR. In one embodiment, the configuration switch 214 comprises a sensitive-gate SCR. Alternatively, the configuration switch 214 can comprise a mechanical switch having mechanical contacts. In another alternative, the configuration switch can comprise a suitable relay.

The reset switch 218 and a series capacitor 220 are coupled across the AC input 202. The reset switch 218 can comprise any suitable type of switch. In an exemplary embodiment, the reset switch 218 comprises a semiconductor switch, preferably a gate-driven semiconductor switch such as a TRIAC or an SCR. In one embodiment, the reset switch 218 comprises a sensitive-gate SCR.

The reset switch 218 is enabled by the controller circuit 210 if the controller circuit 210 senses a change in the AC line from the "low-line" range to the "high-line" range. A reset sequence is then performed. The reset sequence includes the controller circuit 210 immediately sensing the change in the AC line from the "low-line" range to the "high-line" range.

The gate currents for the first and second pair of gate-driven semiconductor switches 208A-208D are disabled. However, the first and second pair of gate-driven semiconductor switches 208A-208D will not cease conducting until a conduction current through them falls below a preset or a holding current. The reset switch 218 is enabled by a gate current from the gate drive circuit 212. The reset switch 218 provides a short circuit across the input filter 204 which diminishes the conduction current. The series capacitor 220 limits a duration of the short circuit of the reset switch 218 to a small pulse sufficient to facilitate cessation of conduction in the first and second pair of gate-driven semiconductor switches 208A-208D. The controller circuit 210 waits a period of time until the voltage of the AC input signal is stable. The controller circuit 210 resumes operation in either the "high-line" voltage range or the "low-line" voltage range depending on the sensed voltage of the AC input signal.

The reset sequence includes additional steps if the AC input signal changes from the "high-line" range to the "low-line" range. The additional steps of the reset sequence include the controller circuit 210 immediately sensing the change in the AC line from the "high-line" range to the "low-line" range. The controller circuit 210 waits a period of time until the voltage of the AC input signal is stable. The controller circuit 210 disables the gate current to the configuration switch 214 and enables the gate currents for the first and second pair of gate-driven semiconductor switches 208A-208D. The conduction of the first and second pair of gate-driven semiconductor switches 208A-208D will automatically disrupt the conduction current of the configuration switch 214.

The converter circuit 114 comprises a dual isolated buck-type converter comprising the first switching circuit 230 and the second switching circuit 240 coupled with the output circuit 117. The first switching circuit 230 includes a first input 231 coupled with a first switching device 232 which is coupled with a first isolation transformer 234. The first input 231 can include the upper and the lower node 231A, 231B, respectively. The first switching device 232 comprises a semiconductor switch. Any number of semiconductor switches known to a person of skill in the art can be used. In an exemplary embodiment, the first switching device 232 comprises a MOSFET (metal-oxide-semiconductor field-effect transistor) transistor. The first switching circuit 230 can be provided with several different configurations. In an exemplary embodiment, the first switching circuit 230 can be configured as a single switch forward converter. A person of skill in the art will appreciate that a two-switch and four switch configuration can be substituted for the first switching device 232. For example, the two-switch configuration (not shown) can comprise a half-bridge converter or even a push-pull converter. The four switch configuration (not shown) can comprise a full-bridge converter.

Figure 6:
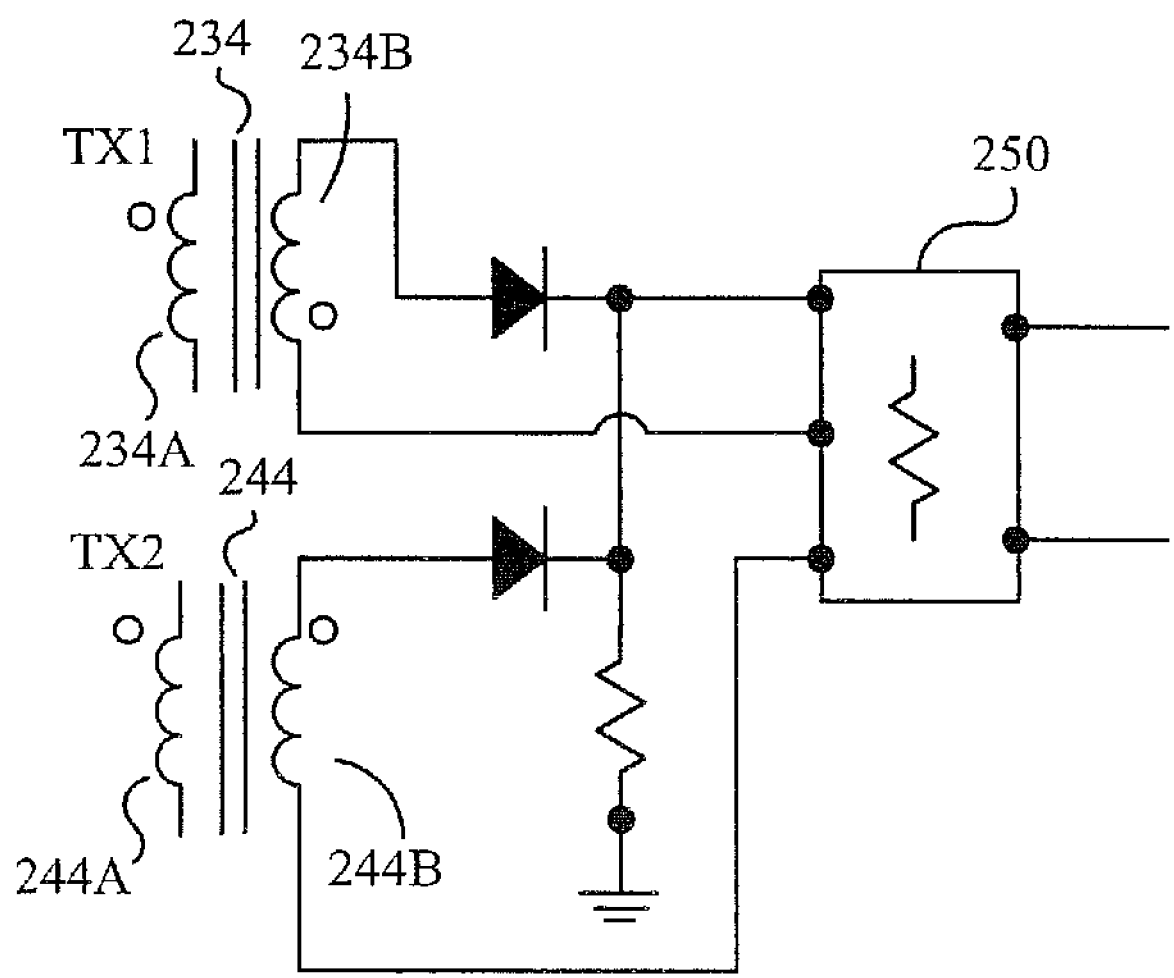
FIG. 6 illustrates a schematic diagram of a power supply apparatus in accordance with an embodiment of the invention.

The first isolation transformer 234 includes a first primary 234A and a first secondary 234B. A turns-ratio of the first isolation transformer 234 can be a value that depends on a desired voltage of an output voltage Vout. A first terminal of the first secondary 234B is coupled with a load 250 of the output circuit 117 and a second terminal of the first secondary 234B is coupled with a first terminal of a second secondary 244B of a second isolation transformer 244. A second terminal of the second secondary 244B is also coupled with the load 250. In an exemplary embodiment, the first secondary 234B and the second secondary 244B are coupled with each other in series. Alternatively, the first and the second secondary 234B, 244B respectively are coupled with each other in parallel. In still another embodiment, the first and the second secondary 234B, 244B respectively are coupled with each via ORed-diodes or ORed synchronous MOSFETs, as illustrated in FIG. 6, which shows such an exemplary configuration in a simplified manner. In one embodiment, a synchronization module (not shown) which is included in the controller circuit 210 can provide synchronization between the first and the second switching circuits 230, 240 when the first and the second secondaries 234B, 244B are coupled with each other in the series coupling embodiment or the parallel coupling embodiment. Synchronization of the first and the second switching circuits 230, 240 would not be required when the first and the second secondaries 234B, 244B are coupled with each other via the ORed-diodes or the ORed synchronous MOSFETs embodiment.

The second switching circuit 240 includes a second input 241 coupled with a second switching device 242 which is coupled with a second isolation transformer 244. The second input 241 can include the upper and the lower node 241A, 241B, respectively. The second switching device 242 comprises a semiconductor switch. Any number of semiconductor switches known to a person of skill in the art can be used. In an exemplary embodiment, the second switching device 242 comprises a MOSFET transistor. The second switching circuit 240 can be provided with several different configurations. In an exemplary embodiment, the second switching circuit 240 can be configured as a single switch forward converter. A person of skill in the art will appreciate that a two-switch and a four-switch configuration can be substituted for the second switching device 242. For example, the two-switch configuration (not shown) can comprise a half-bridge converter or even a push-pull converter. The four switch configuration (not shown) can comprise a full-bridge converter.

A pulse width modulation (PWM) module (not shown) is included in the regulated power apparatus 200. The PWM module is used in controlling a duty cycle of the first and the second switching device 232, 242. The PWM module regulates the output voltage Vout by sampling the output voltage Vout and adjusting the duty cycle of the first and the second switching device 232, 242 to a higher or lower value until the output voltage is approximately equal to a target voltage for Vout. PWM modules are commonly used in this manner and a person of skill in the art will appreciate this means as well as other means to regulate the output voltage Vout.

The second isolation transformer 244 includes a second primary 244A and the second secondary 244B. A turns-ratio of the second isolation transformer 244 can be a value that depends on the desired voltage of the output voltage Vout. The second secondary 244B is coupled with the output circuit 117 and coupled with the first secondary 234 of the first isolation transformer 234. As described above, the coupling of the second secondary 244B with the first secondary 234B can have several alternatives. In the exemplary embodiment, the second secondary 244B and the first secondary 234B are coupled with each other in series. The output circuit 117 generally includes the load 250. The load 250 can be any suitable device requiring the regulated output voltage Vout. Alternatively, the load 250 may not require tight voltage regulation. In the exemplary embodiment described herewith, the output voltage Vout is regulated. Alternatively, other entities can be regulated such as current and power or a complex combination of voltage, current and power.

The controller circuit 210 may comprise a microprocessor for sensing the AC input signal and determining if the AC input signal is at a voltage potential within the "low-line" range (85 VAC-132 VAC) or within the "high-line" (180 VAC-264 VAC) range. The controller circuit 210 may be powered from the AC line voltage V1. Alternatively, the controller circuit 210 can comprise analog components. The controller circuit 210 provides a control signal to enable either the first configuration 205A or the second configuration 205B, 205C. The control signal is also generated by the controller circuit 210 to enable or disable the gate drive circuit 212. If the controller circuit 210 senses that the AC input signal is within the "low-line" range (85 VAC-132 VAC), the controller circuit 210 enables the first configuration 205A. The controller circuit 210 enables the first configuration 205A by enabling the configuration switch 214. The configuration switch 214 behaves similar to a short circuit when enabled. When the first configuration 205A is enabled, the first and second pair of gate-driven semiconductor switches 208A-208D are disabled. If the controller circuit 210 senses that the AC input signal is within the "high-line" (180 VAC-264 VAC) range, the controller circuit 210 enables the second configuration 205B, 205C. The controller circuit 210 enables the second configuration 205B, 205C by disabling the configuration switch 214. The configuration switch 214 is an open circuit when disabled. When the second configuration 205B, 205C is enabled, the first and second pair of gate-driven semiconductor switches 208A-208D are disabled.

Figure 2B:
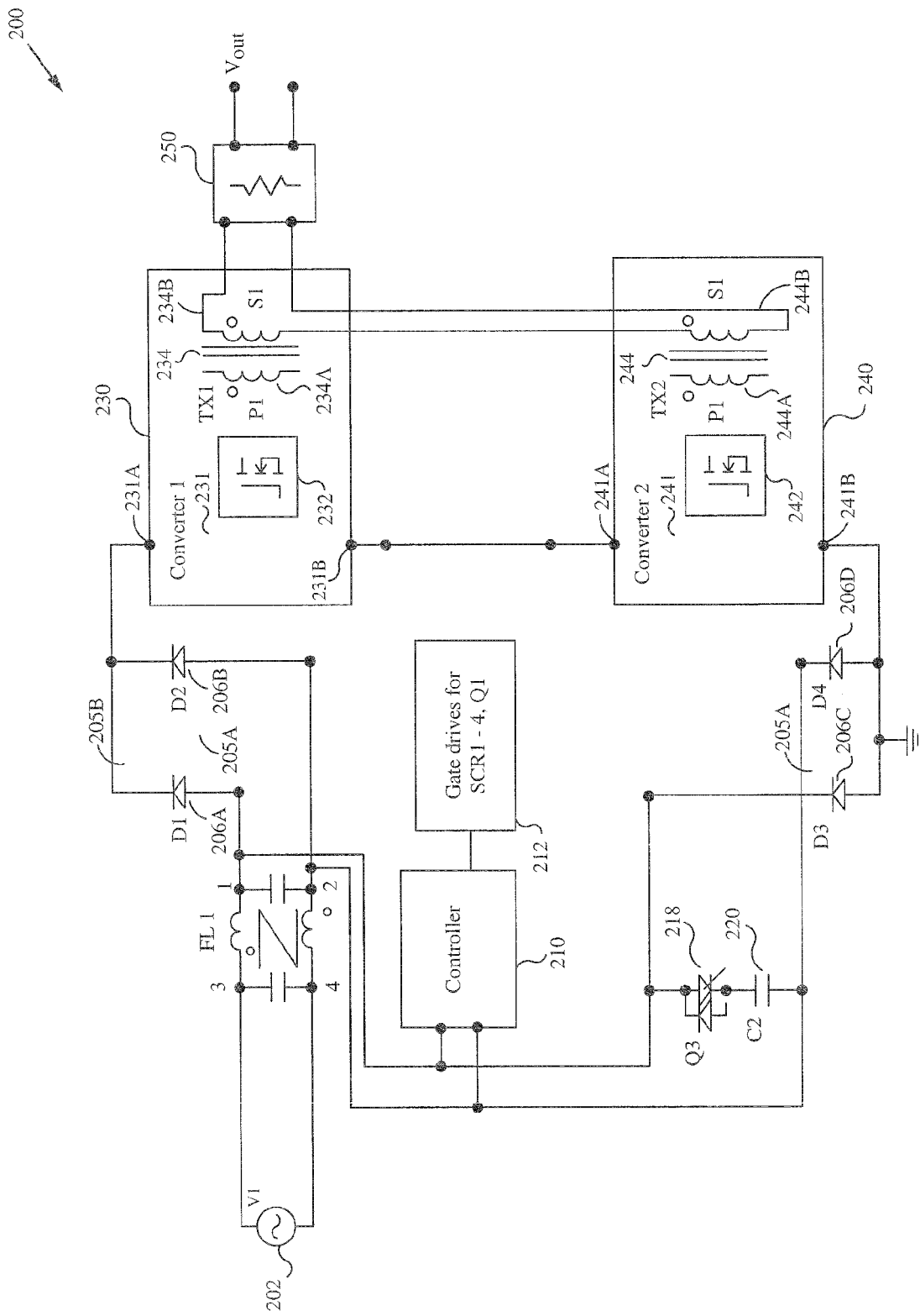
FIG. 2B illustrates a schematic diagram of a power supply apparatus in a series configuration in accordance with an embodiment of the invention.
Figure 2C:
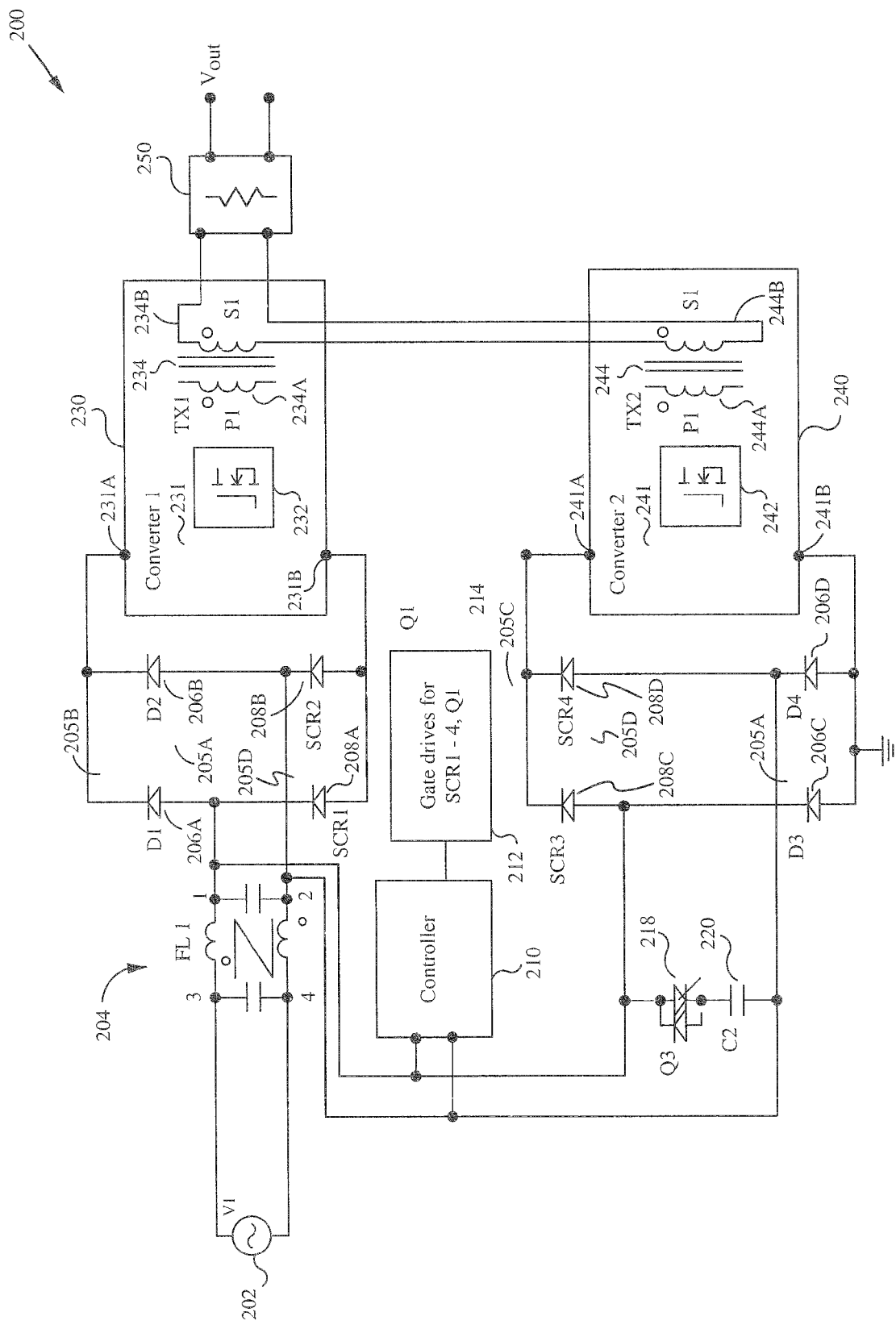
FIG. 2C illustrates a schematic diagram of a power supply apparatus in a parallel configuration in accordance with an embodiment of the invention.

FIGS. 2B and 2C show simplified schematics of the regulated power apparatus 200 in FIG. 2A in operation arranged in the first configuration and the second configuration respectively. In FIG. 2B, the apparatus 200 is shown in the first configuration in a simplified manner. Viewing FIG. 2B while referring back to FIG. 2A, the configuration switch 214 is turned "on" so that current may flow freely from the lower node 231B of converter 1 230 to the upper node 241A of converter 2 240. Simultaneously, SCRs 1-4 (208A-D in FIG. 2A) are not driven, and as a result form an open circuit by blocking current in both directions. The simplified path with the open circuits removed and the conducting circuits shorted is shown in FIG. 2B. Rectified current flows through D1 206A to converter 1 230 via the top node 231A. The rectified current also flows from the bottom node 231E on converter 1 230 to the top node 241A on converter 2 240. As described above, the first and second isolation transformers 234 and 244 are coupled together through their secondaries 234B and 244B respectively. In this first configuration, it will be clear to the person of ordinary skill having the benefit of this disclosure that because current flows from converter 1 230 to converter 2 240 that converter 1 230 and converter 2 240 are in a series connection.

FIG. 2C shows a simplified schematic of the apparatus 200 in FIG. 2A in a second configuration. In this configuration, the configuration switch 214 in FIG. 2A is "off" or opened such that no current is able to flow in either direction from bottom node 231B of converter 1 230 to the top node 241A of converter 2 240. Also, SCRs 1-4 208A-D are simultaneously driven "on." When an SCR is driven, the SCR will behave as a diode. A person of ordinary skill having the benefit of this disclosure will recognize that D1 206A, D2 206B, SCR1 208A and SCR2 208B form a bridge rectifier, also known as a full wave rectifier, circuit coupled with the top node 231A and bottom node 231B of converter 1 230.

Similarly, SCR3 208C and SCR 4 208D appear as diodes from nodes 1 and 2 from the input filter 204. SCR3 208C, SCR 4 208D, D3 206C and D4 206D form a second bridge rectifier or full wave rectifier circuit coupled to the top node 241A and bottom node 241B of converter 2 240. In the second configuration described above and shown in FIG. 2C, converter 1 230 and converter 2 240 are both coupled to the output of the input filter 204. Stated differently, any output of the input filter 204 is impressed simultaneously and equally upon both converter 1 230 and converter 2 240. Therefore, converter 1 230 and converter 3 240 are operating in a parallel configuration. In contrast to the series configuration of FIG. 2B.

Figure 3:
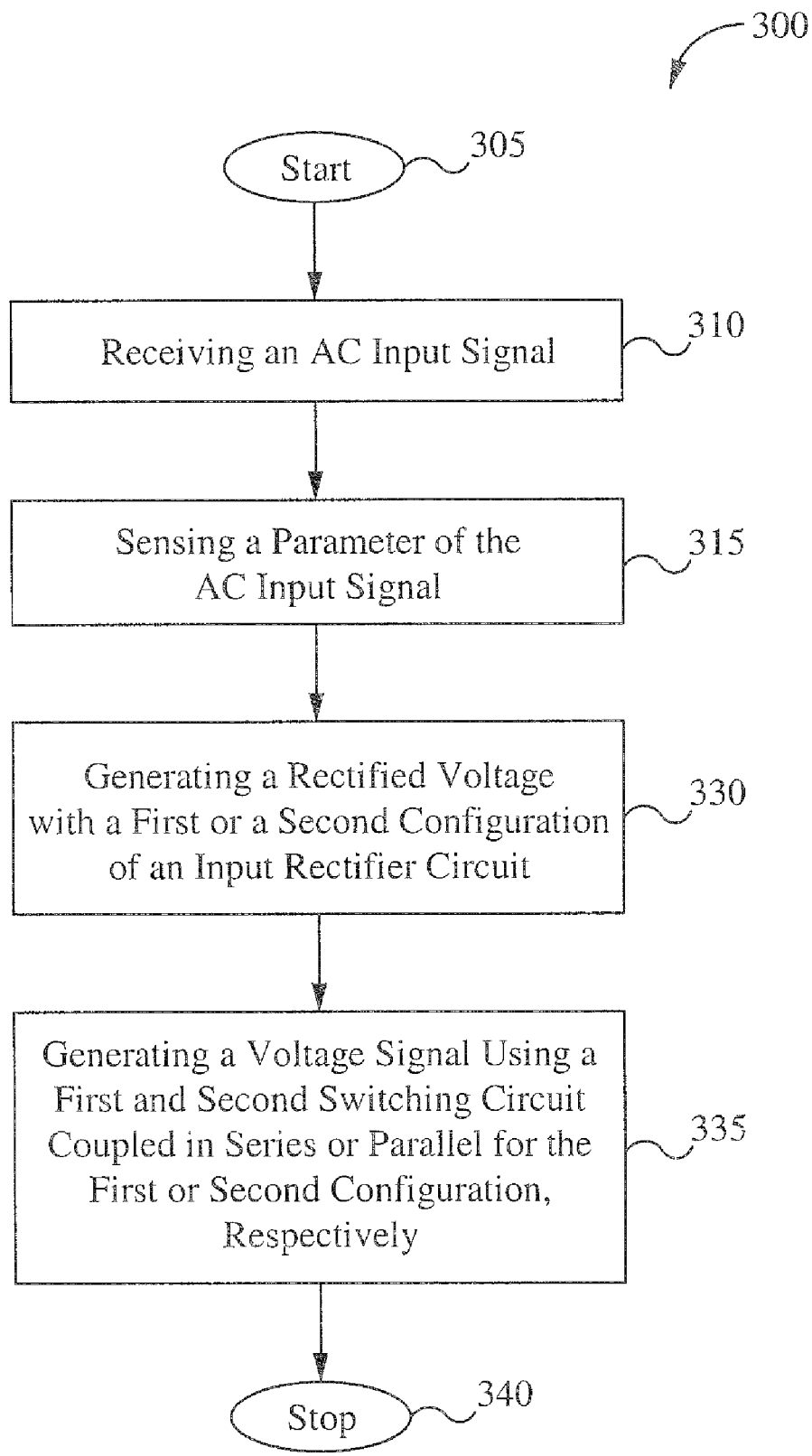
FIG. 3 illustrates a process flow diagram for a method of regulating a power supply apparatus in accordance with the present invention.

Turning to FIG. 3, with reference to FIG. 2A, a process flow diagram 300 is shown for a method of regulating a power supply apparatus 200 in accordance with an embodiment of the invention. The power supply apparatus 200 is provided as a series or parallel configured dual converter. The method begins at the step 305. At the step 310 an AC input signal is received at the AC input 202 of the controlled rectifier circuit 112. The AC input 202 is coupled with the filter circuit 204 which is coupled with the input rectifier circuit 205 used for generating an unregulated rectified voltage signal. The AC input 202 is configured to receive and operate on an AC input signal in a voltage range of 85 VAC to 264 VAC. The input rectifier circuit 205 includes a first configuration of a bridge rectifier circuit 205A and a second configuration of the bridge rectifier circuit 205B, 205C.

At the step 315, a parameter of the input AC power signal is sensed with the controller circuit 210. The controller circuit 210 is coupled with the input rectifier circuit 205 for providing a control signal for enabling either the first configuration 205A or the second configuration 205B, 205C according to a parameter of the input AC power signal. The parameter of the input AC power signal comprises a voltage in either a high-line range (180 VAC-264 VAC) or a voltage in a low-line range (85 VAC-132 VAC). The controller circuit 210 enables the first configuration 205A for AC input signals in the high-line range (180 VAC-264 VAC) and enables the second configuration 205B, 205C for AC input signals in the low-line range (85 VAC-132 VAC). In one embodiment, the controller circuit 210 can keep the first and second switching circuits 230, 240 disabled if the AC input signal is out of both the "low-line" and the "high-line" ranges, since voltages outside of the "low-line" and the "high-line" ranges typically indicate AC line power disturbances. The controller circuit 210 can then wait until the AC input signal is stable within either the "low-line" or the "high-line" range.

At the step 330, a rectified voltage signal is generated according to the parameter of the input AC power signal either with the first configuration 205A or with the second configuration 205B, 205C. In the first configuration 205A, the input rectifier circuit 205 is coupled through an enabled configuration switch 214 such that the first and second pair of semiconductor switches 206A, 206B and 206C, 206D are coupled with the first and the second input 231, 241 of the first and the second switching circuit 230, 240 respectively, which are coupled in series.

Figure 4A:
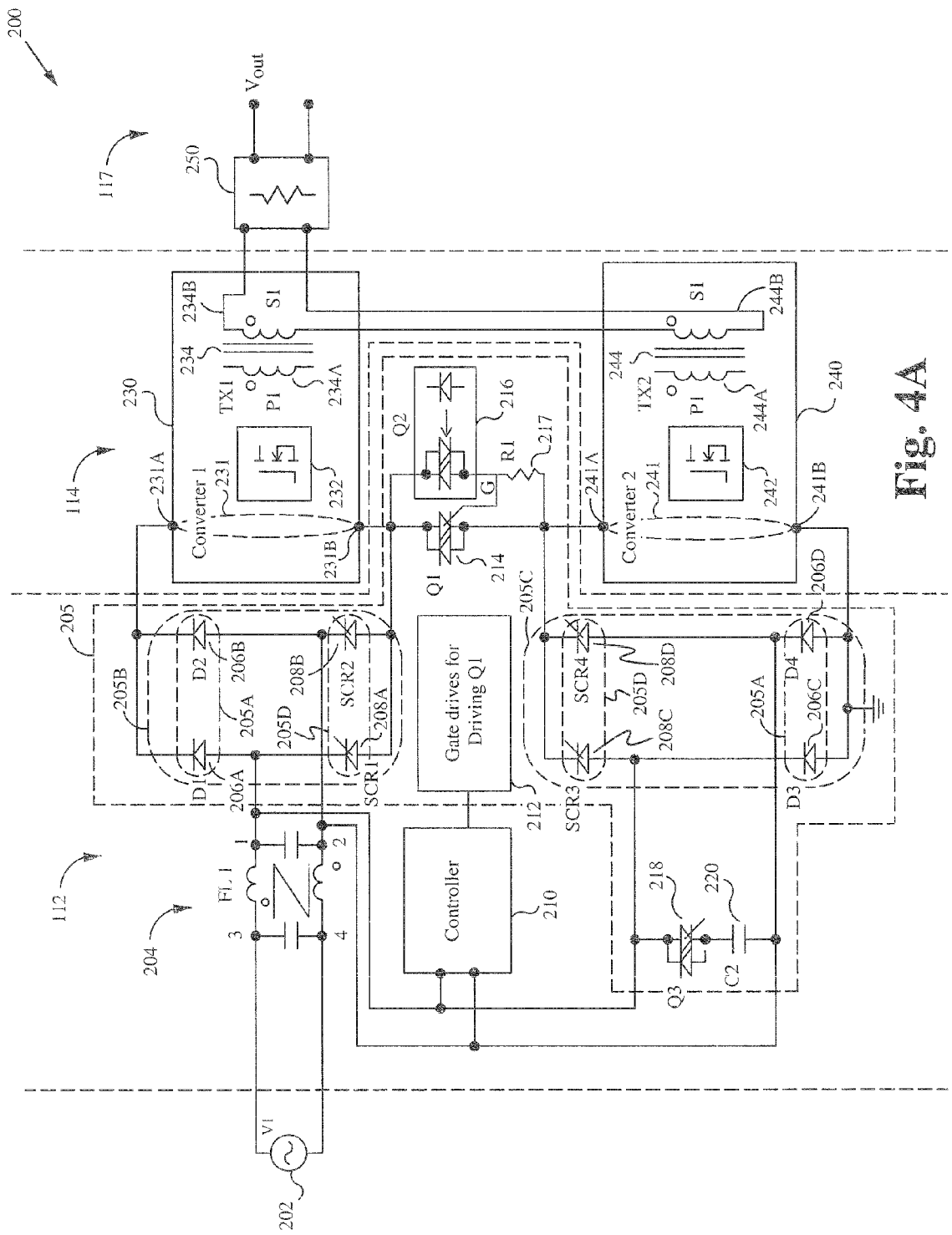
FIGS. 4A-4B illustrate a schematic diagram of current paths through a first configuration of a bridge rectifier of a power supply apparatus in accordance with an embodiment of the invention.
Figure 4B:
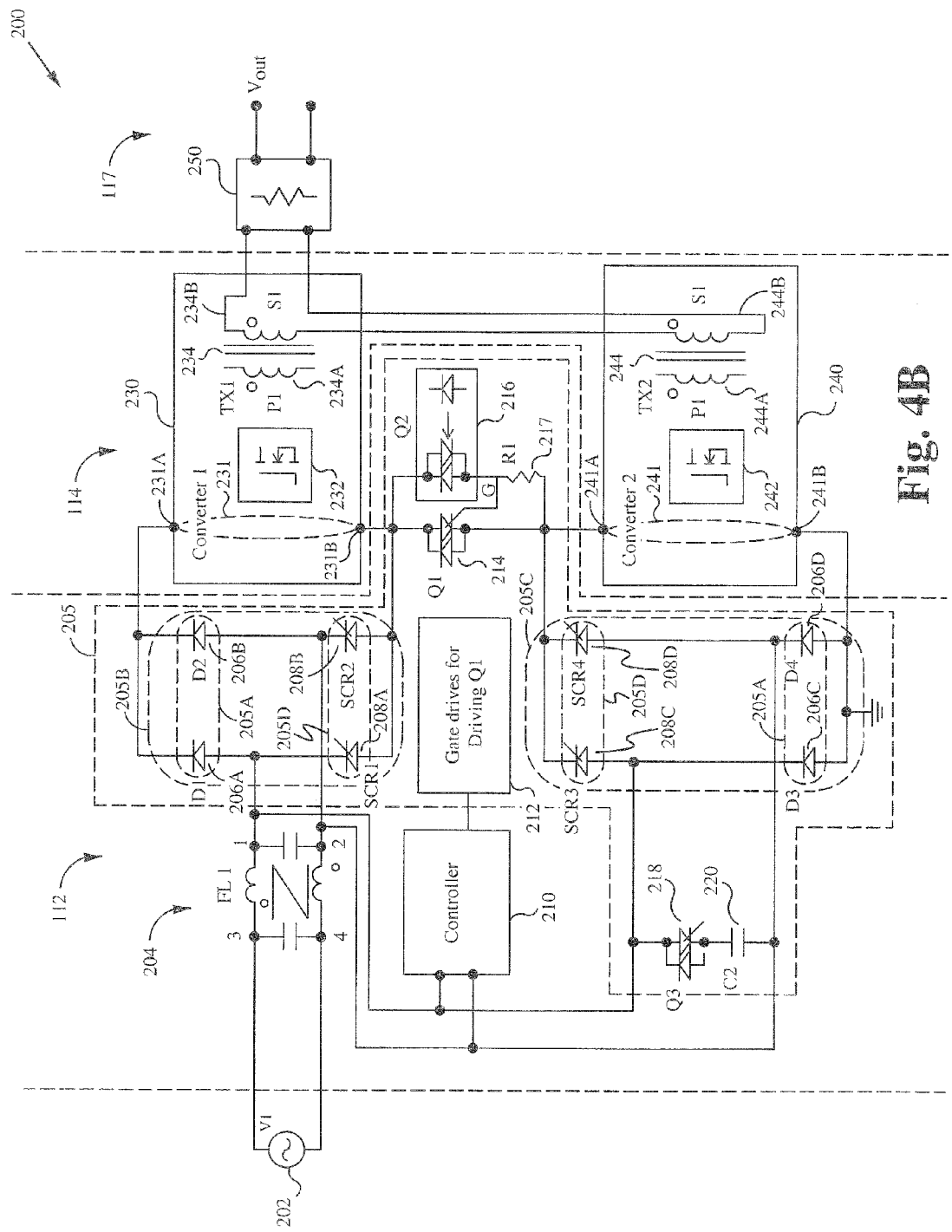

FIGS. 4A and 4B show the current path through the first configuration of the bridge rectifier 205A when the AC input voltage signal 202 is at high-line (180 VAC-264 VAC). FIG. 4A shows the current path during a positive portion of the high-line AC input 202. The first and second input 231, 241 of the first and second switching circuits 230, 240, respectively, are connected in series through the configuration switch 214. The first and second switching circuits 230, 240 are connected at a primary side of the first and second isolation transformer 234, 244, respectively. The controller circuit 210 enables the configuration switch 214 using the gate drive 212. Current flows through the semiconductor switch 206A to the series connected first and second switching circuits 230, 240 to the semiconductor switch 206D. FIG. 4B shows the current path during a negative portion of the high-line AC input 202. As with the positive portion of the high-line AC input 707, the controller circuit 210 enables the configuration switch 214 using the gate drive 212 to connect the first and second switching circuits 230, 240 in series. The first and second switching circuits 230, 240 are still connected at a primary side of the first and second isolation transformer 234, 244, respectively. Current flows through the semiconductor switch 206C to the series connected first and second switching circuits 230, 240 to the semiconductor switch 206B.

In the second configuration 205B, 205C, the configuration switch 214 is disabled. The input rectifier circuit 205 is coupled such that the first and second pair of semiconductor switches 206A, 206B and 206C, 206D and the first and second pair of gate-driven semiconductor switches 208A, 208B and 208C, 20D are coupled with the first and the second input 231, 241 of the first and the second switching circuit 230, 240 respectively, which are coupled in parallel.

Figure 4C:
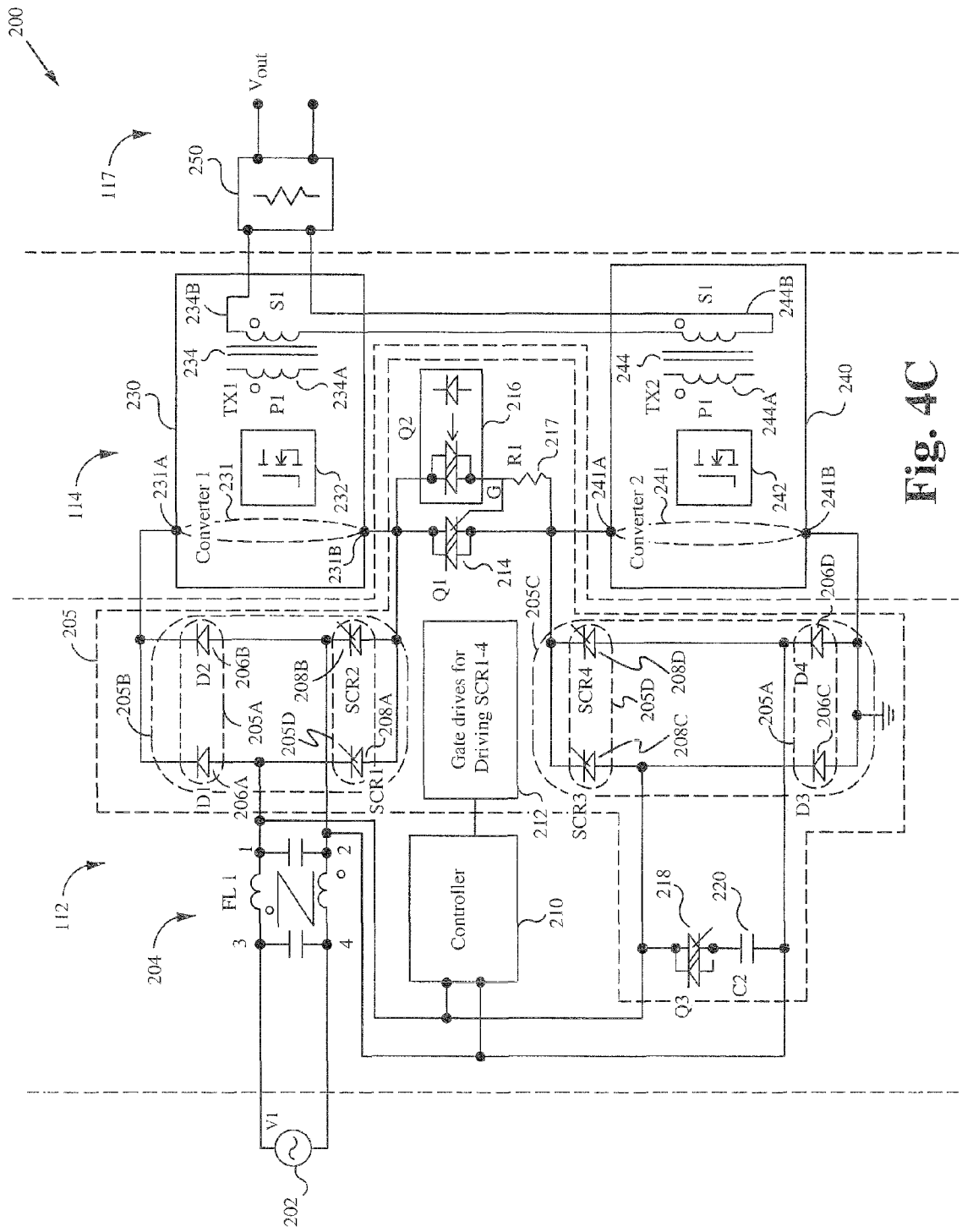
FIGS. 4C-4D illustrate a schematic diagram of current paths through a second configuration of a bridge rectifier of a power supply apparatus in accordance with an embodiment of the invention.
Figure 4D:
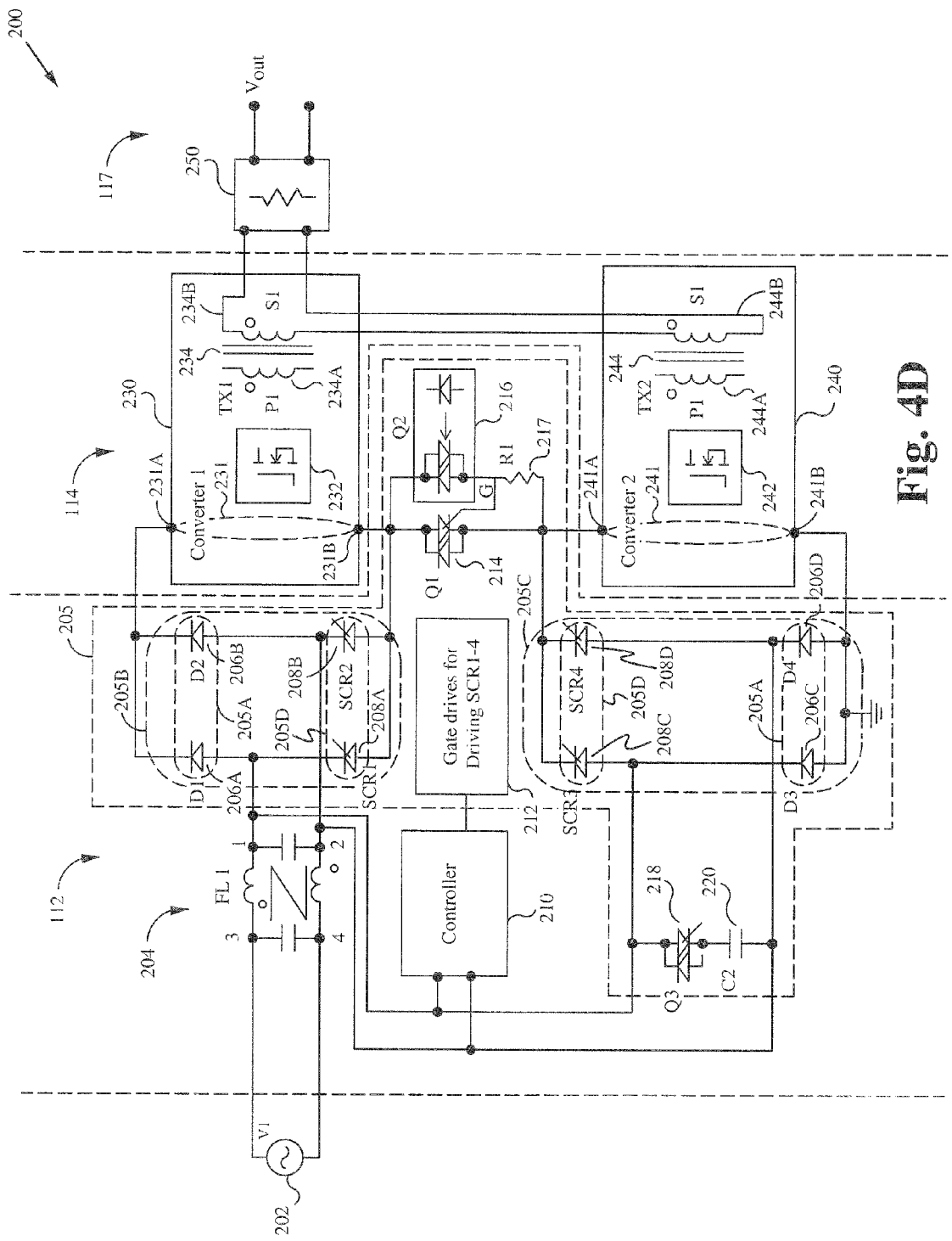
Figure 5:
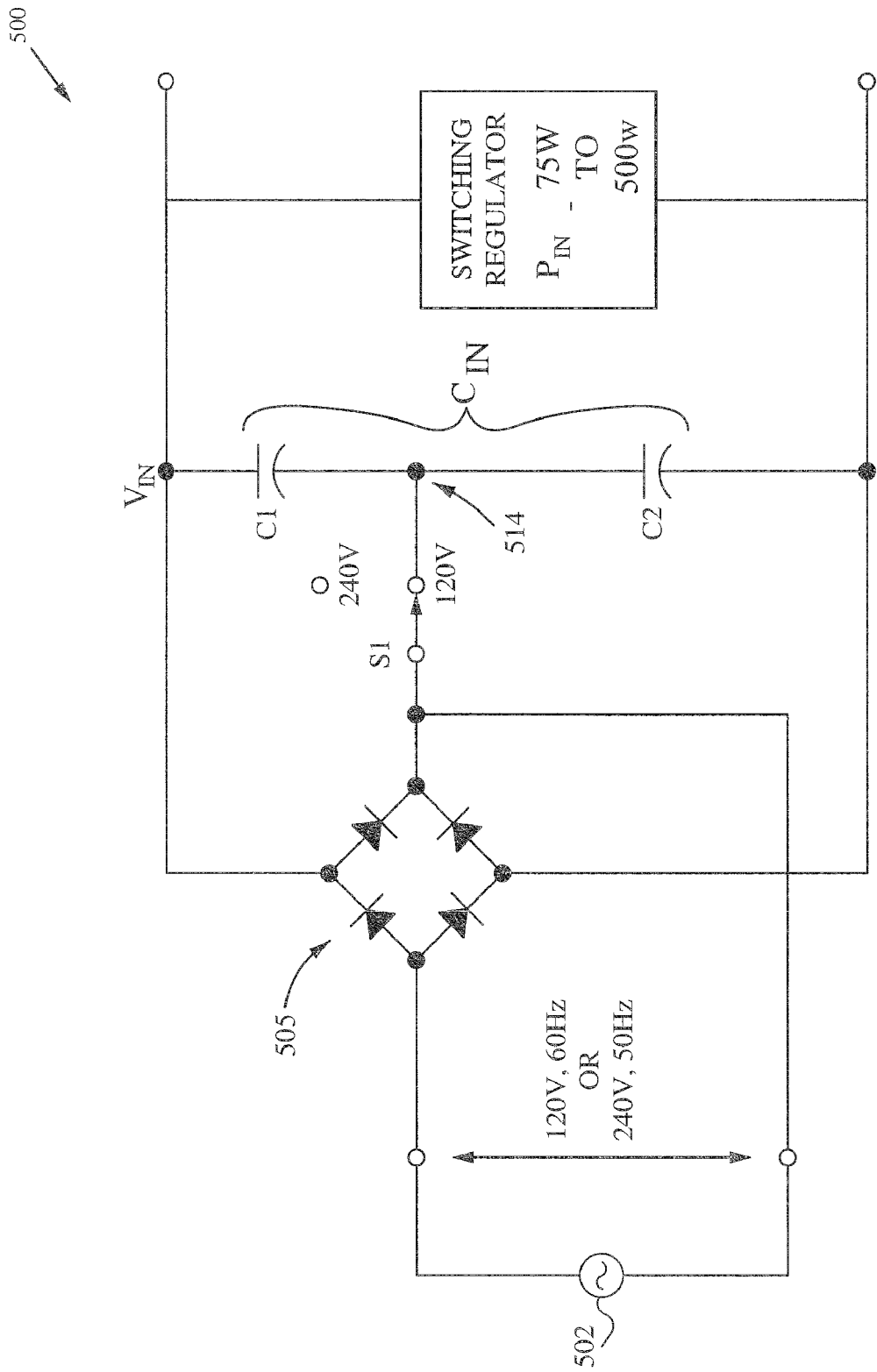
FIG. 5 illustrates a schematic diagram of a conventional line switcher circuit.

FIGS. 4C and 4D show the current path through the second configuration of the bridge rectifier 205B, 205C when the AC input voltage signal 202 is at low-line (85 VAC-132 VAC). FIG. 4C shows the current path during a positive portion of the low-line AC input 202. The first and second input 231, 241 of the first and second switching circuits 230, 240, respectively, are connected in parallel through the first and second pair of gate-driven semiconductor switches 208A, 208B and 208C, 20D. The first and second switching circuits 230, 240 are connected at a primary side of the first and second isolation transformer 234, 244, respectively. The controller circuit 210 enables the first and second pair of gate-driven semiconductor switches 208A, 208B and 208C, 20D using the gate drive 212. Current flows through the first switching circuit 230 via the semiconductor switch 206A and the gate-driven semiconductor switch 208B. Similarly, current flows through the second switching circuit 240 via the semiconductor switch 206D and the gate-driven semiconductor switch 208C.

FIG. 4D shows the current path during a negative portion of the low-line AC input 202. As with the positive portion of the low-line AC input 202, the controller circuit 210 enables the first and second pair of gate-driven semiconductor switches 208A, 208B and 208C, 20D using the gate drive 212 to connect the first and second switching circuits 230, 240 in parallel. The first and second switching circuits 230, 240 are still connected at a primary side of the first and second isolation transformer 234, 244, respectively. Current flows through the first switching circuit 230 via the semiconductor switch 206B and the gate-driven semiconductor switch 208A. Similarly, current flows through the second switching circuit 240 via the semiconductor switch 206C and the gate-driven semiconductor switch 208D.

At the step 335, a regulated voltage signal is generated with the converter circuit 114 that is coupled with the controlled rectifier circuit 112. The converter circuit 114 comprises the first switching circuit and the second switching circuit 230, 240 both coupled with the output circuit 117. The first switching circuit 230 comprises the first switching device 232 coupled with the first transformer 234. The second switching circuit 240 comprises the second switching device 242 coupled with the second transformer 244. The output circuit 117 comprises the load 250. The reset switch 218 is enabled with the controller circuit 210 when the controller circuit 210 determines a change in the AC input signal from a low-line level to a high-line level. Power is sent through two paths or configurations which are later combined into a single output Vout. In the high-line or first configuration as described above in FIGS. 4A-4B, the controlled input rectifier circuit 205 includes the first and second switching circuits 230, 240 coupled in series at first and second inputs 231, 241. The first and second switching circuits 230, 240 are coupled in series through the enabled configuration switch 214. Power from the first and second switching circuits 230, 240 is combined through the series connected secondaries 234B, 244B and is coupled to the output circuit 117. In the low-line or second configuration as described above in FIGS. 4C-4D, the controlled input rectifier circuit 205 includes the first and second switching circuits 230, 240 coupled in parallel at first and second inputs 231, 241. The configuration switch 214 is disabled. The first and second switching circuits 230, 240 are coupled in parallel through the enabled gate-driven semiconductor switches 208A, 208B, 208C, 208D and the first and second pair of semiconductor switches 206A, 206B and 206C, 206D. Power from the first and second switching circuits 230, 240 is combined through the series connected secondaries 234B, 244B and is coupled to the output circuit 117. The process 300 ends at the step 340.

Each of the first and second switching circuits 230, 240 operates as an entire converter. Each of the first and second switching circuits 230, 240 receive power during both positive and negative half-cycles, regardless of whether the AC input 202 is at low-line or high-line. Heavy filtering is not required to for the current invention operate. Therefore, it is possible to use the present invention with high-power factor converters that require a nearly sinusoidal current from a line over the entire line cycle. In alternative embodiments, the first and second switching circuits 230, 240 can be replaced by any number of loads. For example, lighting loads designed to operate at low-line.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

What is claimed is:

1. A power supply apparatus comprising:
a converter circuit comprising a first switching circuit and a second switching circuit both coupled with an output circuit;
an input rectifier circuit configured for receiving an AC input voltage and for generating a rectified voltage, the input rectifier circuit coupled with a first and a second input of the first and the second switching circuit, respectively, the input rectifier circuit including one or more controlled switches, the input rectifier circuit including a first configuration of a bridge rectifier and a second configuration of the bridge rectifier; and
a controller circuit coupled with a configuration switch and coupled with the input rectifier circuit for providing a control signal for enabling either the first configuration or the second configuration according to a parameter of the AC input voltage, the first configuration couples the first and second input of the first and the second switching circuit, respectively, in series, whereas the second configuration couples the first and second input of the first and the second switching circuit, respectively, in parallel, wherein the configuration switch is controlled by the controller circuit for coupling the first and second switching circuits together, wherein the first configuration includes a first set of switches comprising a first pair and a second pair of semiconductor switches and the second configuration includes a second set of switches comprising the first set of switches and the one or more controlled switches, wherein the one or more controlled switches comprise a first pair of gate-driven semiconductor switches and a second pair of gate-driven semiconductor switches.

2. The apparatus of claim 1, wherein the first switching circuit comprises a first switching device coupled with a first primary, the second switching circuit comprising a second switching device coupled with a second primary, the first and second primary included in a first and second transformer of the first and the second switching circuit, respectively.

3. The apparatus of claim 1, wherein the first configuration comprises the bridge rectifier coupled through an enabled configuration switch, wherein the second configuration comprises the configuration switch being disabled and the first and second pair of gate-driven semiconductor switches being enabled.

4. The apparatus of claim 1, wherein a gate drive circuit is coupled with the first and the second pair of gate-driven semiconductor switches, the gate drive circuit being enabled by the control signal generated by the controller circuit, wherein the enabled gate drive circuit provides a gate current to the first and the second pair of gate-driven semiconductor switches.

5. The apparatus of claim 1, wherein the second configuration couples the first and second input of the first and the second switching circuit in parallel by coupling each of the first and the second input across the same rectified voltage generated by the input rectifier circuit.

6. The apparatus of claim 1, wherein the parameter of the AC input voltage comprises a voltage in either a high-line range (180 VAC-264 VAC) or a voltage in a low-line range (85 VAC-132 VAC).

7. The apparatus of claim 1, wherein the control signal enables the configuration switch.

8. The apparatus of claim 7, wherein the configuration switch comprises a semiconductor switch.

9. The apparatus of claim 7, wherein the configuration switch comprises a gate-driven semiconductor switch.

10. The apparatus of claim 7, wherein the configuration switch comprises a mechanical switch including mechanical contacts.

11. The apparatus of claim 1, further comprising a reset switch comprising a gate-driven semiconductor switch, which is enabled by the controller circuit when the controller circuit determines a change in the AC input voltage from a low-line level to a high-line level.

12. The apparatus of claim 2, wherein the first and the second transformer include a first and a second secondary, which are coupled with each other in series.

13. The apparatus of claim 2, wherein the first and the second transformer include a first and a second secondary, which are coupled with each other in parallel.

14. The apparatus of claim 2, wherein the first and the second transformer include a first and a second secondary, which are coupled with each other via an ORed diode.

15. A method of regulating a power supply apparatus comprising:
receiving an AC input voltage at an input rectifier circuit, the input rectifier circuit including one or more controlled switches, the input rectifier circuit including a first configuration of a bridge rectifier and a second configuration of the bridge rectifier;
sensing a parameter of the AC input voltage with a controller circuit, the controller circuit coupled with a configuration switch and coupled with the input rectifier circuit for providing a control signal for enabling either the first configuration or the second configuration according to the parameter of the AC input voltage, the first configuration couples a first and second input of a first and a second switching circuit, respectively, in series, whereas the second configuration couples the first and second input of the first and the second switching circuit, respectively, in parallel, wherein the configuration switch is controlled by the controller circuit for coupling the first and second switching circuits together;
generating a rectified voltage according to the parameter of the AC input voltage either with the first configuration or the second configuration; and
generating an output voltage signal with a converter circuit that is coupled with the input rectifier circuit, the converter circuit comprising the first switching circuit and the second switching circuit both coupled with an output circuit, wherein the first configuration includes a first set of switches comprising a first pair and a second pair of semiconductor switches and the second configuration includes a second set of switches comprising the first set of switches and the one or more controlled switches, wherein the one or more controlled switches comprise a first pair of gate-driven semiconductor switches and a second pair of gate-driven semiconductor switches.

16. The method of claim 15, wherein the first switching circuit comprises a first switching device coupled with a first primary, the second switching circuit comprising a second switching device coupled with a second primary, the first and second primary included in a first and second transformer of the first and the second switching circuit, respectively.

17. The method of claim 15, wherein the first configuration comprises the bridge rectifier coupled through an enabled configuration switch, wherein the second configuration comprises the configuration switch being disabled and the first and second pair of gate-driven semiconductor switches being enabled.

18. The method of claim 15, further comprising enabling a gate drive circuit by generating the control signal, the gate drive circuit being coupled with the first and the second pair of gate-driven semiconductor switches, wherein the enabled gate drive circuit provides a gate current to the first and the second pair of gate-driven semiconductor switches.

19. The method of claim 15, further comprising the second configuration coupling the first and second input of the first and the second switching circuit in parallel such that each of the first and the second input is coupled across the same rectified voltage generated by the input rectifier circuit.

20. The method of claim 15, wherein the parameter of the AC input voltage comprises a voltage in either a high-line range (180 VAC-264 VAC) or a voltage in a low-line range (85 VAC-132 VAC).

21. The method of claim 15, further comprising enabling the configuration switch with the control signal.

22. The method of claim 21, wherein the configuration switch comprises a semiconductor switch.

23. The method of claim 21, wherein the configuration switch comprises a gate-driven semiconductor switch.

24. The method of claim 15, further comprising enabling a reset switch with the controller circuit when the controller circuit determines a change in the AC input voltage from a low-line level to a high-line level, the reset switch comprising a gate-driven semiconductor switch.

25. The method of claim 16, further comprising providing the first and the second transformer such that a first and a second secondary are coupled with each other in series.

26. The method of claim 16, further comprising providing the first and the second transformer such that a first and a second secondary are coupled with each other in parallel.

27. The method of claim 16, further comprising providing the first and the second transformer such that a first and a second secondary are coupled with each other via an ORed diode.

28. A power supply apparatus comprising:
a converter circuit comprising a first switching circuit and a second switching circuit both coupled with an output circuit;
an input rectifier circuit configured for receiving an AC input voltage and for generating a rectified voltage, the input rectifier circuit coupled with a first and a second input of the first and the second switching circuit, respectively, the input rectifier circuit including one or more controlled switches, the input rectifier circuit including a first configuration of a bridge rectifier and a second configuration of the bridge rectifier; and
a controller circuit coupled with a configuration switch and coupled with the input rectifier circuit for providing a control signal for enabling either the first configuration or the second configuration according to a parameter of the AC input voltage, the first configuration couples a first and second input of the first and the second switching circuit, respectively, in series, whereas the second configuration couples the first and second input of the first and the second switching circuit, respectively, in parallel, wherein the configuration switch is controlled by the controller circuit for coupling the first and second switching circuits together, the control signal used in enabling or disabling the configuration switch, wherein the first configuration includes a first set of switches comprising a first pair and a second pair of semiconductor switches and the second configuration includes a second set of switches comprising the first set of switches and the one or more controlled switches, wherein the one or more controlled switches comprise a first pair of gate-driven semiconductor switches and a second pair of gate-driven semiconductor switches.

29. The apparatus of claim 28, wherein the first switching circuit comprises a first switching device coupled with a first primary, the second switching circuit comprising a second switching device coupled with a second primary, the first and second primary included in a first and second transformer of the first and the second switching circuit, respectively.

30. The apparatus of claim 28, wherein the second configuration couples the first and second input of the first and the second switching circuit in parallel by coupling each of the first and the second input across the same rectified voltage generated by the input rectifier circuit.

* * * * *